UNITED STATES PATENT OFFICE.

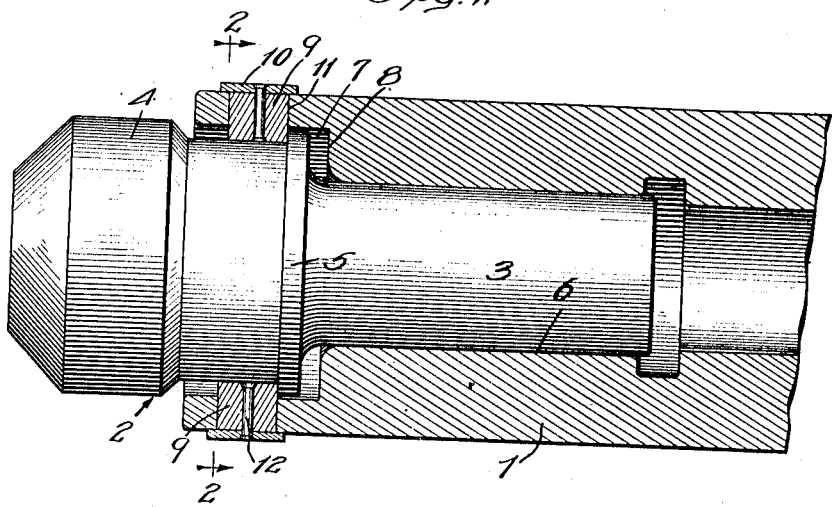

WILLIAM H. KELLER, OF GRAND HAVEN, MICHIGAN, ASSIGNOR TO KELLER PNEUMATIC TOOL COMPANY, OF GRAND HAVEN, MICHIGAN, A CORPORATION OF MICHIGAN.

PERCUSSION-TOOL.

1,317,019.  Specification of Letters Patent.  Patented Sept. 23, 1919.

Application filed April 13, 1918. Serial No. 228,340.

*To all whom it may concern:*

Be it known that I, WILLIAM H. KELLER, a citizen of the United States, residing at Grand Haven, in the county of Ottawa and State of Michigan, have invented certain new and useful Improvements in Percussion-Tools, of which the following is a specification.

The invention relates to percussion tools and more particularly to rivet set retainers therefor; and the object of the invention is to provide a rivet set retainer of simple construction and arrangement, which may be readily applied to or removed from a tool body, and which will at the same time be very effective in operation.

The object of the invention thus generally stated, together with other and ancillary advantages, may be attained by the construction and arrangement illustrated in the accompanying drawings forming part hereof, in which Figure 1 is a longitudinal central sectional view of the forward end of a pneumatic hammer embodying the features of my invention. Fig. 2 is a transverse sectional view taken on line 2—2 of Fig. 1. Fig. 3 is a detached perspective view of the retainer.

In the drawings, 1 indicates the barrel or body of a pneumatic hammer having a rivet set 2 in its forward end. The hammer body may be of any preferred construction, and the rivet set comprises a shank 3, a head 4, and an intermediate flange or annular shoulder 5, the hammer body being provided with a bore 6 for the shank 3 and an enlarged cavity 7 for the head 4. The inward movement of the rivet set in the body is thus limited by the shoulder 5 engaging with an annular shoulder 8 formed by enlarging the bore 6 to form the cavity 7.

The retainer is adapted to limit the outward movement of the rivet set in the body and comprises a pair of dogs 9 fixed upon the inner surface of a split ring 10 at the free ends thereof and arranged to protrude through oppositely disposed transverse grooves 11 in the body into the path of movement of the shoulder 5 on the rivet set. The dogs 9 are arcuate in form and preferably their inner surfaces are concaved to conform to the periphery of the rivet set. Thus the dogs are each adapted to engage with the annular shoulder 5 on the rivet set throughout an arc of substantial length. Any suitable means may be employed for securing the dogs to the ring as, for example, rivets 12.

It will be understood that the grooves 11 in the body are made of a depth slightly greater than the thickness of the walls of the cavity 7, so that at their centers the grooves open into the cavity to permit the dogs to protrude into the path of movement of the shoulder 5 on the rivet set, as shown most clearly in Fig. 1. The flat bottomed ends of the grooves are thus arranged to be engaged by the opposite ends of the arcuate dogs to prevent a rotation thereof relative to the body.

The ring 10 may be made of any preferred length, but preferably it is only made of a length slightly greater than a semicircle so that it may be readily sprung off from the body, it being evident that no great amount of pressure is necessary to hold the dogs in position in their grooves. When the ring is made of such length that its ends lie over the grooves 11, as shown in Fig. 2, it is made of a width slightly greater than the width of the grooves, and the dogs 9 are secured thereon so that a portion of each edge of the ring overlies the periphery of the body adjacent the edges of the grooves. The rotundity of the body thus serves to hold the ring and dogs in position thereon to permit of a free operation of the rivet set.

The retainer is very simple in construction and it will be evident that it may be very easily applied to and removed from the tool body. Furthermore, it serves to effectively hold the rivet set in operative position in the body.

I claim as my invention:

1. A percussion tool having, in combination, a body having a transverse groove opening at its center into the body, a rivet set operable in the body and having a shoulder thereon arranged to limit the inward movement of the set, and a retainer for the rivet set comprising a split ring having an elongated dog fixed thereon and arranged to be entered in said groove with a portion protruding into the path of movement of said shoulder on the rivet set to limit the outward movement of the set, said retainer dog being movable longitudinally of the groove transversely of the body.

2. A percussion tool having, in combination, a body having a pair of oppositely disposed transverse grooves having flat bottoms and opening at their centers into the body, a rivet set operable in the body and having a shoulder thereon arranged to limit the inward movement of the set, and a retainer for the rivet set comprising a split ring having an elongated dog on each end thereof arranged to be entered in said grooves with its ends bearing on the flat bottoms of the grooves and with portions protruding into the path of movement of said shoulder on the rivet set to limit the outward movement thereof, said ring being arranged to engage throughout its length with the periphery of the body.

3. A percussion tool having, in combination, a body, a rivet set operable in the body and having a shoulder thereon arranged to limit the inward movement of the set, and a retainer for the rivet set comprising a split ring having a dog fixed at each end thereof, said body having a pair of flat-bottomed transverse grooves therein opening at their centers into the body and arranged to receive said dogs and permit them to protrude into the path of movement of the shoulder on the rivet set, said ring being adapted to engage with the body to yieldingly hold said dogs against longitudinal movement in their grooves.

4. A percussion tool having, in combination, a body, a rivet set operable in the body and having a shoulder thereon arranged to limit the inward movement of the set, and a retainer for the rivet set comprising a split ring having an elongated dog thereon with a substantially flat inner surface throughout its length, said body having a flat-bottomed transverse groove therein opening at its center into the body and arranged to receive said dog and permit a portion thereof to protrude into the path of movement of the shoulder on the rivet set, the opposite ends of said dog being held by said ring in engagement with the ends of the grooves to hold the retainer against rotation relative to the body.

5. A percussion tool having, in combination, a body, a rivet set operable in the body and having a shoulder thereon arranged to limit the inward movement of the set, and a retainer for the rivet set comprising a split ring having a dog on each end thereof provided throughout its length with a substantially flat inner surface, said body having a pair of transverse grooves therein opening at their centers into the body and arranged to receive said dogs and permit portions thereof to protrude into the path of movement of the shoulder on the rivet set, the opposite ends of said dogs being held by said ring in engagement with the ends of the grooves to hold the retainer against rotation relative to the body, and said ring being arranged to engage throughout its length with the periphery of the body.

6. A percussion tool having, in combination a body having a flat-bottomed transverse groove therein of a depth to open at its center into the body, a rivet set operable in the body and having a shoulder thereon arranged to limit the inward movement of the set, and a retainer for limiting the outward movement of the rivet set comprising a dog entered in said transverse groove with a portion protruding into the path of movement of the shoulder on the rivet set, and means for yieldingly holding said dog in position in its groove.

7. A percussion tool having, in combination, a body, a rivet set operable in said body, and a retainer for the rivet set comprising a dog of substantial length, said body having a straight-cut opening therein arranged to receive said dog and being of a depth to permit a portion of the dog to protrude into the body so as to engage with the rivet set to limit its outward movement, and means for yieldingly holding said dog in position in its groove.

8. A percussion tool having, in combination, a body, a rivet set operable in the body and having an annular shoulder thereon, and means for limiting the outward movement of the rivet set in the body comprising an arcuate dog, said body having a flat-bottomed transverse groove of a depth to provide an opening therein arranged to receive said dog and to permit a portion thereof to protrude into the body and said dog having its inner surface concaved centrally thereof so as to engage with the annular shoulder on the rivet set throughout an arc of substantial length, and means for yieldingly holding said dog in position in its groove.

In testimony whereof, I have hereunto set my hand.

WILLIAM H. KELLER.